March 24, 1953  J. W. RAYMOND  2,632,278
ATTACHMENT FOR FISHHOOKS
Filed Aug. 7, 1951  2 SHEETS—SHEET 1

INVENTOR,
Jerry W. Raymond.
BY
E. E. Vrooman & Co.,
ATTORNEYS.

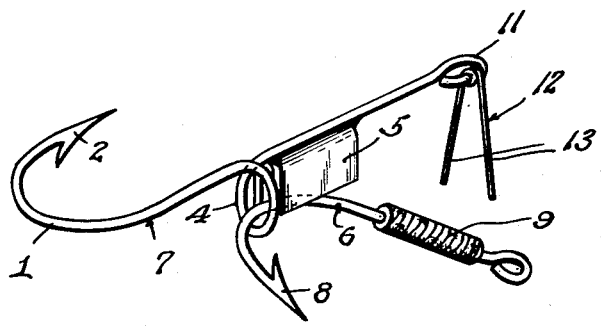
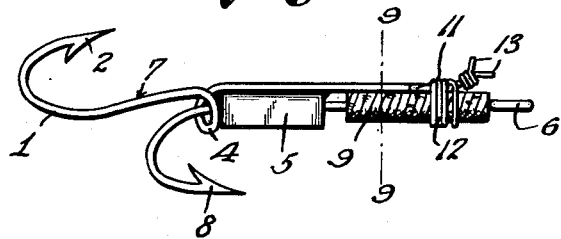
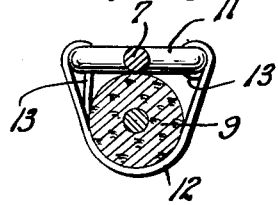
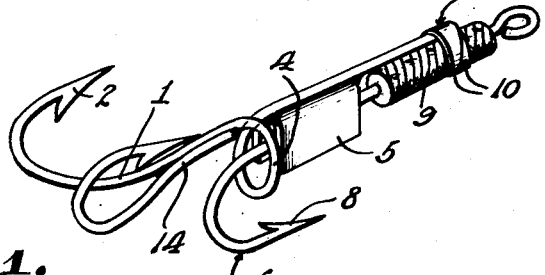
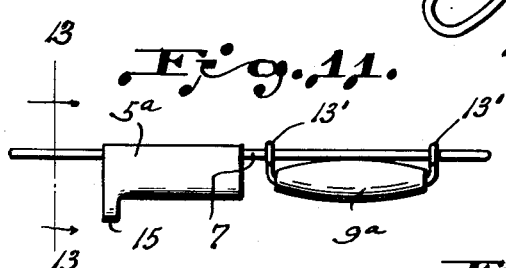

Patented Mar. 24, 1953

2,632,278

UNITED STATES PATENT OFFICE 2,632,278

ATTACHMENT FOR FISHHOOKS

Jerry W. Raymond, Wenatchee, Wash.

Application August 7, 1951, Serial No. 240,686

3 Claims. (Cl. 43—44.82)

This invention relates to an attachment for fish hooks and the like.

An object of the invention is the construction of an efficient attachment whereby an extra hook can be easily attached to the shank of an ordinary fish hook.

Another object of this invention is the construction of an efficient attachment so that an extra hook can be attached to a standard fish hook or to artificial bait, lures, dry or wet flies, bug streamers, spoon or like trollers, etc.

A still further object of this invention is the provision of efficient means for assembling a plurality of hooks, with a suitable float in the assembly, whereby the combination hook structure will not sink too low in the water.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 7 is a perspective view of the attachment, showing a slight modification, and also showing the primary fish hook being placed through the loop of the auxiliary fish hook or attachment.

Figure 8 is a view in side elevation of another embodiment of this invention.

Figure 9 is an enlarged, sectional view, taken on line 9—9, Fig. 8.

Figure 10 is a perspective view, showing three hooks in an assembled position.

Figure 11 is a fragmentary view in side elevation of another embodiment of this invention.

Figure 12 is a sectional view taken on line 12—12, Fig. 11, and looking in the direction of the arrows, while Figure 13 is a similar view showing the lip of the yoke in a closed position.

Figure 1:
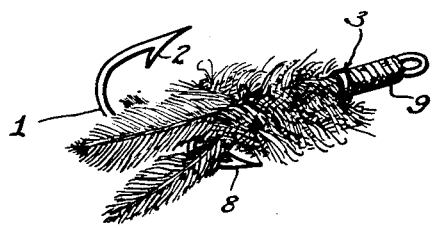
Figure 1 is a perspective view of a device or attachment constructed in accordance with this invention.

Referring to the drawings, in which the preferred specie of this invention is illustrated in Figures 1 to 6, 1 designates the shank of the attachment or auxiliary hook structure, the shank 1 being provided at one end with the usual barb 2, and at its opposite end with an efficient fastening means or clamp 3, which prevents the hook from turning. The shank 2 is bent into a loop or eye 4 which registers with the end of yoke 5, the eye being at right angles to the longitudinal axis of shank 1. An open bottom yoke 5 is fixedly secured to shank 1, near eye 4. This yoke is substantially U-shaped in cross section (Fig. 4) and depends from the shank as shown.

In assembling the primary hook 6 with the auxiliary hook or attachment 7, the barb 8 of said primary hook 6 is first threaded through the eye 4, Fig. 7, and then the primary hook 6 is brought into substantially a parallel position with the shank 1, causing the yoke 5 to straddle the shank of the primary hook. The shank of the primary hook is preferably provided with a suitable float 9, so that the assembled device will not be allowed to sink too deep in the water.

Figure 2:
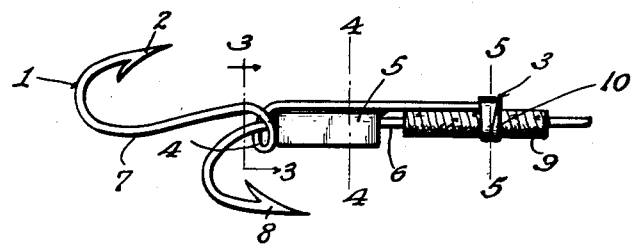
Figure 2 is a view in side elevation of the finished device, wherein is shown two fish hooks in a practical assembled manner, the feathers shown in Fig. 1 being omitted.
Figures 3, 4, 5:
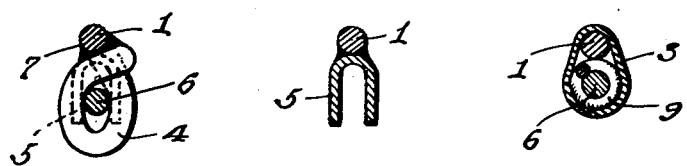
Figure 3 is an enlarged, sectional view, taken on line 3—3, Fig. 2, and looking in the direction of the arrows.
Figure 4 is an enlarged, sectional view, taken on line 4—4, Fig. 2.
Figure 5 is an enlarged, sectional view, taken on line 5—5, Fig. 2.
Figure 6:
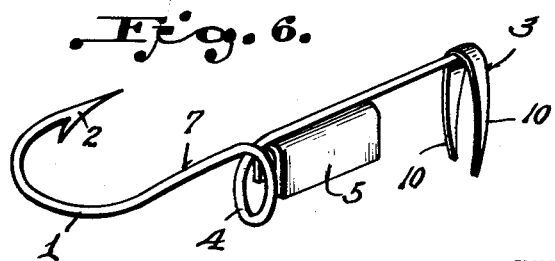
Figure 6 is a perspective view of the attachment.

The clamp 3, Fig. 6, comprises two tapering jaws 10, so that when the jaws 10 are wrapped around the float 9, they form an even-width band throughout, as clearly seen in Fig. 2. By reason of this peculiar structure, the user's hand will not be injured when handling the attachment.

In Figures 7 and 8, in the eye 11 is placed a wire or string 12, having two ends 13. This string or wire is wrapped around the primary hook 6 and the float 9, securing the inner end of the attachment to the primary hook. The yoke 5 braces the structure, as well as forming a saddle for the primary hook to fit into.

In Fig. 11, I have shown a float 9a, suspended by eyes 13 from the shank of the primary hook. The float may be made of any suitable material, such as cork.

In Fig. 10 is shown a supplementary hook 14, fixedly secured to the shank 1 of the attachment, whereby a plurality of hooks can be assembled in an efficient manner.

In Figures 11 to 13, there is shown on the yoke 5a a depending lip 15; this lip can be folded as shown in Fig. 13, to close the lower portion of the yoke, thus assisting in holding the primary hook in an assembled position.

It is to be understood that in all of the modified forms feathers can be attached in any suitable manner, as shown in Fig. 1. The feathers may be colored and any part of the hooks to provide a more attractive and alluring device.

By varying the size of the elements of the attachment, the attachment can be used on or in connection with different fishing tackle. In other words, the fastening or clamping means and the yoke principle can be adapted to other fishing hooks or artificial bait.

It is to be understood that eye 4 and yoke 5 hold the auxiliary hook or attachment 7 rigidly in position with the primary hook 6; also the yoke 5 may be constructed of wire, metal or other material.

While I have described the preferred embodiments of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In an attachment of the class described, the combination of a primary hook provided with a float, an auxiliary hook having a loop portion extended around a portion of said primary hook, said auxiliary hook provided with a yoke straddling said primary hook, and said auxiliary hook provided with a clamp having tapering jaws wrapped around said float.

2. In an attachment of the class described, the combination of a primary hook provided with a float between its ends, an auxiliary hook provided with a loop portion extended around a portion of said primary hook, said auxiliary hook provided with a yoke straddling said primary hook between said loop portion and float, and said auxiliary hook provided with a clamp engaging said float.

3. In an attachment of the class described, the combination of a primary hook provided with a float between its ends, an auxiliary hook provided with a loop portion extended around a portion of said primary hook, said auxiliary hook provided with a yoke straddling said primary hook between said loop portion and float, and said auxiliary hook provided at its inner end with fastening means engaging said float and holding said auxiliary hook to said float.

JERRY W. RAYMOND.

REFERENCES CITED

The following references are of record in the file of this patent:

UNITED STATES PATENTS

| Number | Name | Date |
| --- | --- | --- |
| 564,517 | Hastings | July 21, 1896 |
| 912,955 | Harber | Feb. 16, 1909 |
| 1,114,698 | Lane | Oct. 20, 1914 |
| 1,379,422 | Thorsten | May 24, 1921 |
| 1,739,590 | Hill | Dec. 17, 1929 |
| 1,899,790 | Blum | Feb. 28, 1933 |
| 2,094,267 | Faria | Sept. 28, 1937 |

FOREIGN PATENTS

| Number | Country | Date |
| --- | --- | --- |
| 99,729 | Sweden | June 27, 1940 |